United States Patent
Rubin

(10) Patent No.: US 8,024,569 B2
(45) Date of Patent: *Sep. 20, 2011

(54) METHOD FOR SECURE REMOTE BACKUP

(75) Inventor: Aviel D. Rubin, Owings Mills, MD (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1127 days.

This patent is subject to a terminal disclaimer.

(21) Appl. No.: 11/743,002

(22) Filed: May 1, 2007

(65) Prior Publication Data

US 2008/0005563 A1    Jan. 3, 2008

Related U.S. Application Data

(63) Continuation of application No. 09/682,526, filed on Sep. 14, 2001, now Pat. No. 7,222,233.

(60) Provisional application No. 60/232,259, filed on Sep. 14, 2000.

(51) Int. Cl.
*G06F 21/22* (2006.01)
*H04L 9/32* (2006.01)
*H04K 1/00* (2006.01)

(52) U.S. Cl. .......... 713/168; 713/184; 380/217; 380/255

(58) Field of Classification Search .................. None
See application file for complete search history.

(56) References Cited

U.S. PATENT DOCUMENTS

| | | | |
|---|---|---|---|
| 5,142,578 A | 8/1992 | Matyas et al. | |
| 5,201,000 A | 4/1993 | Matyas et al. | |
| 5,235,641 A | 8/1993 | Nozawa et al. | |
| 5,319,705 A | 6/1994 | Halter et al. | |
| 5,323,464 A | 6/1994 | Elander et al. | |
| 5,495,533 A | 2/1996 | Linehan et al. | |
| 5,659,614 A | 8/1997 | Bailey, III | |
| 5,778,395 A | 7/1998 | Whiting et al. | |
| 5,940,507 A | 8/1999 | Cane et al. | |
| 6,044,155 A | 3/2000 | Thomlinson et al. | |
| 6,115,601 A * | 9/2000 | Ferreira | 455/406 |
| 6,356,937 B1 | 3/2002 | Montville et al. | |
| 6,408,389 B2 | 6/2002 | Grawrock et al. | |
| 6,544,126 B2 * | 4/2003 | Sawano et al. | 463/42 |
| 6,704,866 B1 * | 3/2004 | Benayoun et al. | 713/151 |
| 6,792,539 B1 * | 9/2004 | Oishi et al. | 713/194 |
| 7,010,689 B1 | 3/2006 | Matyas et al. | |
| 7,222,233 B1 * | 5/2007 | Rubin | 713/168 |
| 2004/0049468 A1 | 3/2004 | Walmsley | |

OTHER PUBLICATIONS http://www.rsasecurity.com/rsalabs/node.asp?id-2253.
H. Krawczyk, M. Bellare, R. Canetti—HMAC—Feb. 1997—RFC 2104-.

* cited by examiner

*Primary Examiner* — Christopher Revak

(57) ABSTRACT

The present invention is directed to an architecture and mechanism for securely backing up files and directories on a local machine onto untrusted servers over an insecure network.

20 Claims, 3 Drawing Sheets

METHOD FOR SECURE REMOTE BACKUP

CROSS REFERENCE TO RELATED APPLICATIONS

This application is a continuation of U.S. patent application Ser. No. 09/682,526 filed Sep. 14, 2001, which is now U.S. Pat. No. 7,222,233, which claims priority to U.S. Provisional Application Ser. No. 60/232,259, filed on Sep. 14, 2000, the contents of which are incorporated herein by reference in its entirety.

BACKGROUND OF INVENTION

The invention relates to systems and methods for securely transferring data between a local storage area and a remote storage area. Many systems and schemes have been devised to "backup" important information on various storage media, i.e. maintain another copy of the information so that the information may be restored should the original copy of the information become damaged or otherwise unavailable. Unfortunately, backup media rarely receive the same protection and attention as the original data itself. Despite the critical nature of backup in recovering from loss due to accidental or malicious failure, it is one of the most overlooked processes when it comes to site security.

Most backup techniques today involve transferring data over a network, which thereby renders the backup data vulnerable to attack at several points. There are several commercial products that offer network-based backup services. See, e.g., backup.com, BitSTOR.com, backjack.com, datalock.com, systemrestore.com, trgcomm.com, sgii.com, veritas.com/us/products/telebackup. The most common technique for protecting backups is to encrypt files locally using a key derived from a passphrase. While such services range in features and in style of architecture, unfortunately, none of them are well-designed from the security point-of-view. Many are in fact insecure as well as inefficient and do not provide the proper level of data authentication and confidentiality.

SUMMARY OF INVENTION

The present invention is directed to an architecture and mechanism for securely backing up files and directories on a local device onto untrusted remote servers over an insecure network. Backup files are compressed and then encrypted, in that order locally, and then transferred to a remote site for storage. In accordance with an embodiment of the invention, a first and second cryptographic key are derived from a user-provided passphrase. It is advantageous to perform checking to make sure that the user-provided pass phrase has enough entropy to derive a key of adequate length. The backup files are compressed and added to a bundle. An authentication code is generated for the bundle using the first cryptographic key, and the code added to the bundle. Finally, the bundle is encrypted using the second cryptographic key, preferably with a strong block cipher such as triple-DES. The bundle is tagged with some identification information and then sent to the remote server. The remote server stores and indexes the bundle by the tags, preferably after performing user authentication.

In accordance with another embodiment of the invention, files are restored by requesting the bundle from the remote server, for example by date. The first cryptographic key and second cryptographic key are again derived from a user-provided passphrase. The bundle is decrypted using the second cryptographic key and the authentication code checked using the first cryptographic key. If verified correctly, the restore may proceed by decompressing the files from the bundle. Using the present invention, the file system structure and file names are advantageously hidden from the remote server and from anyone listening in on the network. The server bundles can be made available to anyone. The strong encryption and authentication properties make them tamper evident and opaque to anyone who cannot obtain a user passphrase or break the authentication and encryption functions.

These and other advantages of the invention will be apparent to those of ordinary skill in the art by reference to the following detailed description and the accompanying drawings.

DETAILED DESCRIPTION

Figure 1:
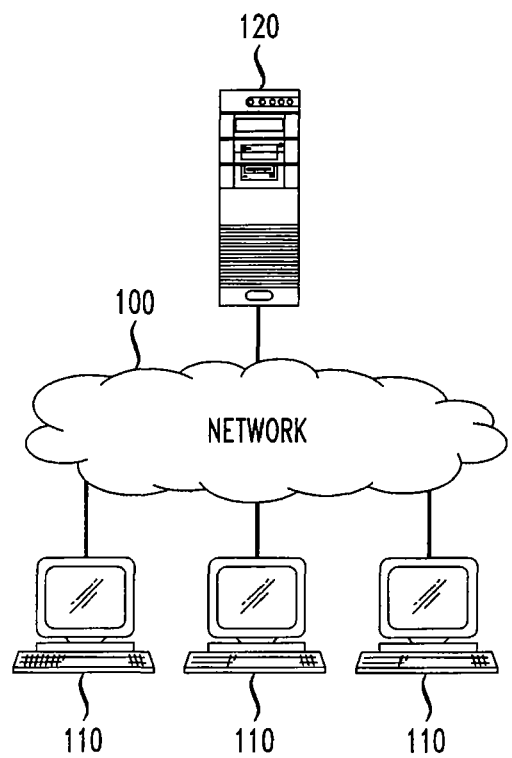
FIG. 1 illustrates a remote backup system comprising local machines connected to an untrusted server over an insecure network.

In FIG. 1, one or more backup clients 110 are provided with access to a remote backup server 120 over a network 100. The backup clients 110 can be any computing device that stores information, e.g. and without limitation, a conventional computer, a personal digital assistant, or some other general purpose computing device. The device can include a processor, input means, an interface to network 100, a storage area for the information to be backed up, and a storage area for processor instructions that implement an embodiment of the present invention. Network 100 can be any environment capable of connecting the backup clients 110 to the remote server 120. For example and without limitation, network 100 can be a local area network (LAN) or a wide area network (WAN). Such networking environments are well-known in the art and are commonplace in offices, enterprise-wide computer networks, intranets, and the Internet. Remote server 120 can be any computing device capable of receiving and storing backup files, such as a conventional server computer, a network personal computer, a network node, etc.

The trust model is that the local environment is trusted while the network 100 is not. Neither is the remote server 120. It is assumed that there is a secure method of obtaining the client side program. For example, the client backup program can have a well-known hash that the user is able to verify on the client end. The particular method utilized to securely obtain a copy of the client side program that-has not been tampered with, although relevant for security analysis of the remote backup system, is not relevant to the invention.

Figure 3:
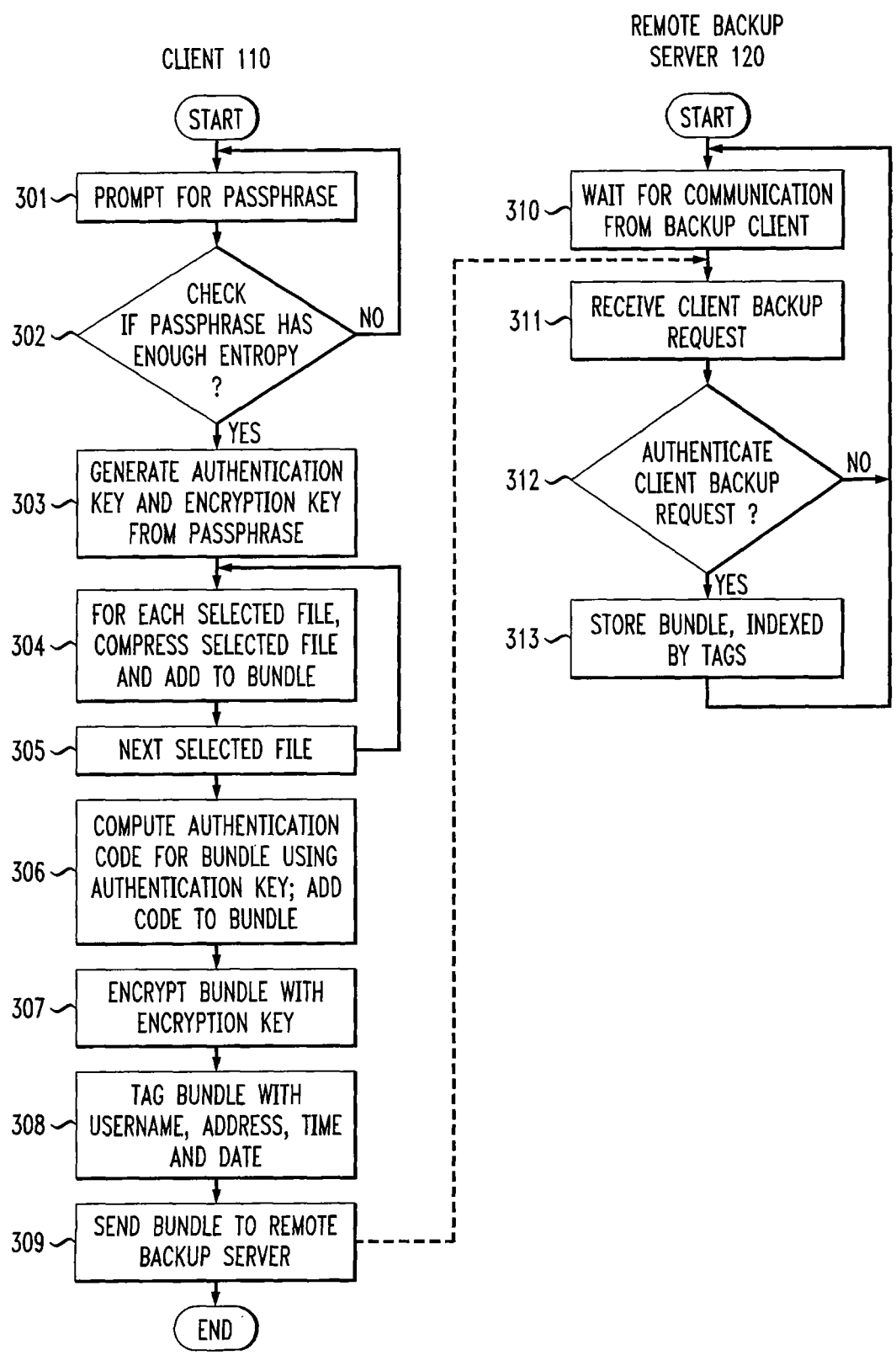
FIG. 3 is a flowchart of the processing performed by the backup client and the remote backup server during a backup operation, in accordance with an embodiment of the invention.

FIG. 3 is a flowchart of the processing performed by the backup client 110 and the remote backup server 120 during a backup operation, in accordance with an embodiment of the invention. The user starts a session, which is an interaction with the software for the purpose of backup or restore. When the user starts a session, at step 301, the user is prompted for a passphrase. Assuming the session is a backup operation, which may be selected by the user before or after the passphrase prompt, it is advantageous for the system to do some proactive checking and make sure that the pass phrase has enough entropy for the next key generation step. Using known methods emanating from information theory, the entropy for the pass phrase can be readily calculated and compared to the amount of entropy required for the desired keyspace. If the entered passphrase does not have enough entropy, the user is prompted to enter another passphrase or to continue adding characters to the pass phrase until it has enough entropy for the key generation step. One particularly advantageous way of accomplishing this is by displaying a progress bar. The user is required to continue entering characters to the pass phrase until the progress bar is full. The user can, of course, continue adding characters to the pass phrase after the progress bar is full but is not allowed to proceed until the bar is at least full. In practice, the user should probably use the same or a similar pass phrase for all sessions; otherwise the user is likely to forget it or write it down somewhere.

When the system determines that the pass phrase has enough entropy, then, at step 303, a sensible algorithm can be used to derive keys from the pass phrase. For example, and without limitation, a secure one-way hash function can be used to transform the string of characters into a pseudo-random bit string. Any advantageous key crunching method can be utilized with the present invention. It is preferred that the two keys be derived from the pass phrase, and that both keys be of at least 128 bit length. As described in further detail below, one key will be used for authentication while the other will be used for encryption.

The client software, either at this point or before the creation of the passphrase and keys, is used to select one or more files for the backup operation. The client software ideally would resemble a graphical file manager, preferably identical to the "look" and "feel" of the operating system's file manager, e.g. with "folders" and icons for files. In accordance with one embodiment, the client software simply adds backup and restore functionality to an existing file manager. A special input combination can be designated for invoking the backup or restore functionality. For example, the software could designate that the user should press the "shift" and "control" keys while using the mouse to select which files to backup. Alternatively, the user could pick from a previously saved list of files. The user could then activate the backup by pressing a button or selecting from a menu. In a preferred embodiment, unattended backups are not allowed for security reasons. To accomplish unattended backups, the keys would need to be available either in memory on the computer or on disk somewhere. In either case, the key is vulnerable. It is preferable to require the passphrase be entered whenever a backup or restore is about to take place and to erase the key from disk and memory as soon as the work is completed.

With reference again to FIG. 3, a "bundle" is created at step 304. A "bundle" as the term is herein used refers to a backup archive file that is stored at the remote backup server 120 and represents the product of a particular backup session. At steps 304 and 305, each selected file is compressed and added to the bundle. Any known data compression scheme can be utilized. For example, and without limitation, these steps could be in practice the same as creating a zip archive or a Unix tar.gz file, as is known in the art. Then, at step 306, the authentication key generated above is used to compute a message authentication code (MAC) for the bundle. The message authentication code can be computed using a number of known cryptographic authentication functions. See, e.g., Krawczyk et al., "HMAC: Keyed-Hashing for Message Authentication," IETF RFC 2104, Network Working Group 1997, which is incorporated by reference herein. An HMAC can be constructed with the bundle and the authentication key as set forth in RFC 2104. The output is then added to the bundle. At step 307, the bundle is finally encrypted with the encryption key generated above. It is advantageous and preferable to utilize a strong block cipher, such as triple DES or AES. At step 308, the bundle is then tagged with some backup identification information, e.g. the username requesting the backup operation, the network address of the user's machine, the time and date of the backup, etc. At step 309, the bundle is then sent over to the untrusted remote backup server. It should be noted that, due to the nature of how the bundle is constructed, the file system structure and the files names are advantageously hidden from the remote server 120 and from anyone listening in on the network 100.

The remote backup server 120 waits for communications from a backup client 110, at step 310. When the remote server 120 receives a bundle at step 311, it can store the bundle, indexed by the tags, at step 313. It is preferable for the remote backup server 120 to provide some user authentication mechanism when a user performs a backup, e.g. as set forth in step 312 in FIG. 3. Otherwise, although the information on the server is potentially useless to anyone, assuming it is properly encrypted, there may be nothing preventing another user from corrupting or destroying backups. Or attackers could fill up the storage areas of the servers with any other material they want. Users should be strongly advised not to use their backup passphrase, chosen above, to authenticate to the remote backup server 120.

Figure 2:
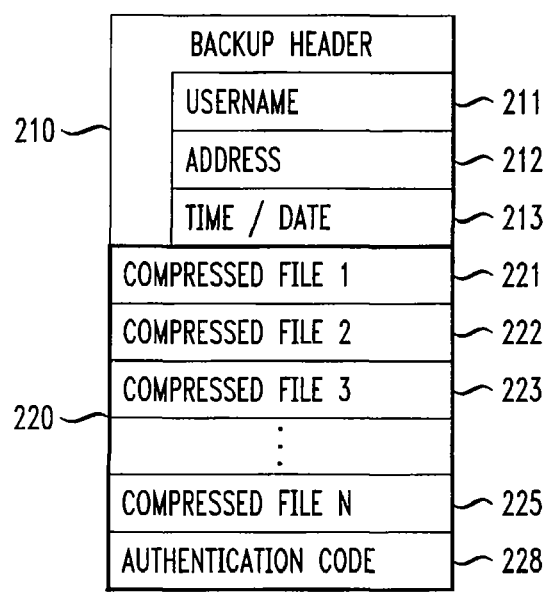
FIG. 2 is a conceptual representation of a bundle created during the backup process, in accordance with an embodiment of the invention.

FIG. 2 is a conceptual representation of a bundle created during the backup process, in accordance with one embodiment of the invention. The bundle 200 comprises a header 210 containing any tags, such as the username 211, the network address of the user's machine 212; and the time and date of the backup 213. The bundle 200 also comprises the encrypted payload containing the compressed backup files, 221, 222, 223, 225, and the authentication code 228 computed for the bundle above.

Figure 4:
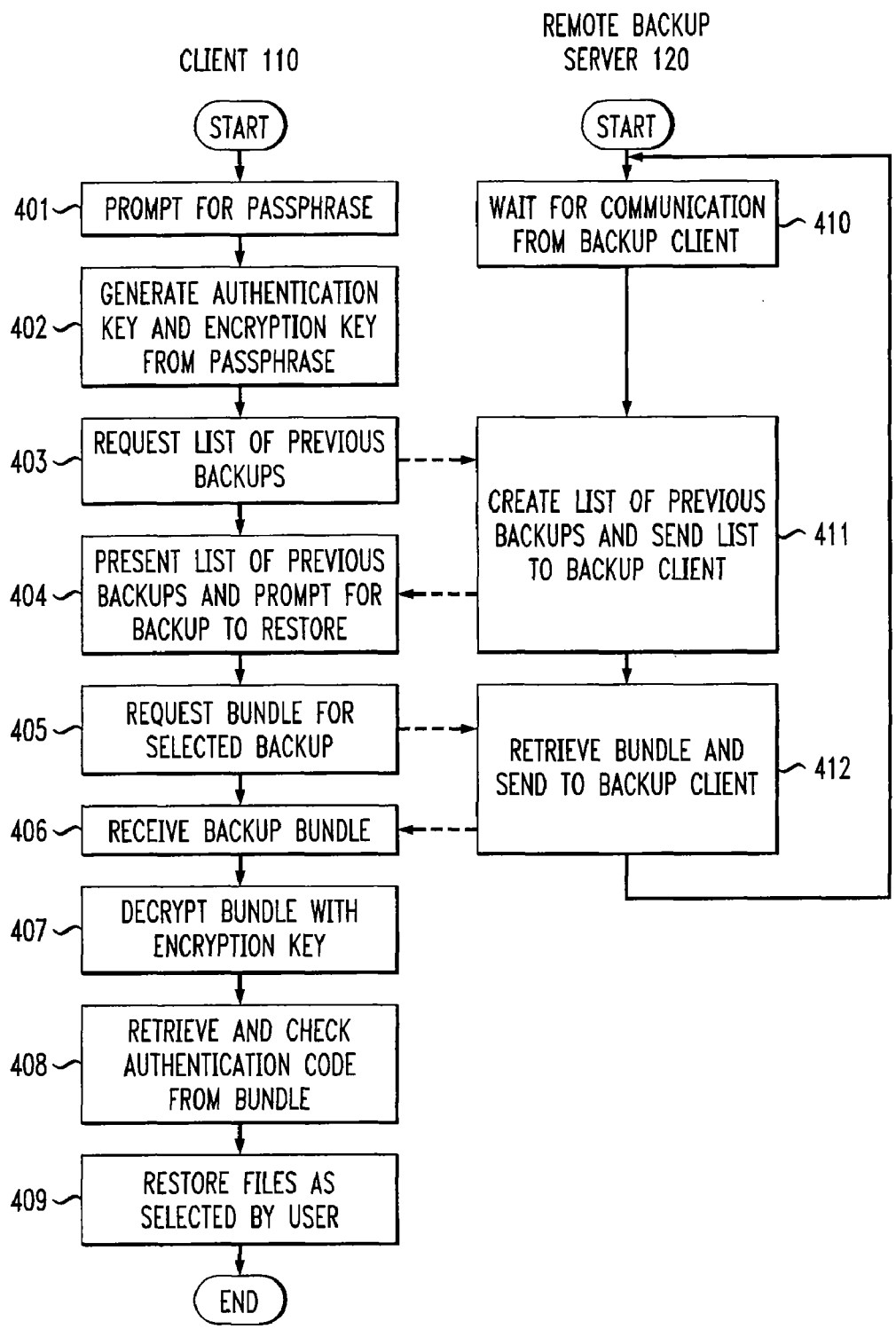
FIG. 4 is a flowchart of the processing performed by the backup client and the remote backup server during a restore operation, in accordance with an embodiment of the invention.

FIG. 4 is a flowchart of the processing performed by the backup client 110 and the remote backup server 120 during a restore operation, in accordance with an embodiment of the invention. At step 401, the user starts a restore session and is prompted for a pass phrase. The authentication key and encryption keys can then be generated from the passphrase, at step 402, or at some later stage such as immediately prior to decrypting any bundle received the remote backup server 120. At step 403, the client program can automatically, or at the command of the user, request a list of previous backups from the remote backup server 120. The remote backup server 120, utilizing the username or network address of the user's machine, can create and download a list of all the previous backup dates, at step 411. At step 404, the list of previous backups can be presented to the user and the user prompted to pick a backup date. At step 405, the user choice of backup is passed to the remote backup server 120 which commences download of the bundle to the client 110, at step 406. After importing the corresponding bundle from the server 120, the client program can then at step 207 decrypt the bundle using the encryption key derived from the passphrase input by the user. At step 408, the authentication code can be checked using the authentication key derived from the password input by the user. If the code verifies correctly, the restore proceeds at step 409. For example. and without limitation, a file manager view of all of the restored files can be presented, anchored at a new root directory. The old file system view can be mounted at a directory such as "c:\restore\oldJoot". The user can preview all of the files in their restored format and decide to accept or reject the restore. If it is accepted, then all of the files are restored in the actual file system. The user can also select to restore on a per file basis as opposed to taking the whole bundle.

One interesting feature of the scheme presented above is that there need not be any user authentication for a restore session. The server 120 can make all of the bundles available to the world. The strong encryption and authentication properties make them tamper evident and opaque to anyone who cannot obtain a user passphrase or break the authentication and encryption functions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. Embodiments within the scope of the present invention also include device readable media and computer readable media having executable program instructions or data fields stored thereon. Such computer readable media can be any available media which can be accessed by a general purpose or special purpose computing device. It is to be understood that the embodiments shown and described herein are only illustrative of the principles of the present invention and that various modifications may be implemented by those skilled in the art without departing from the scope and spirit of the invention.

What is claimed is:

1. A method for processing a file, comprising:
    deriving a first cryptographic key and a second cryptographic key from a user-provided passphrase;
    compressing the file and adding the file to a bundle;
    generating an authentication code for the bundle using the first cryptographic key and adding the authentication code to the bundle; and
    encrypting the bundle using the second cryptographic key prior to sending the bundle to a remote server.

2. The method of claim 1, wherein the bundle is encrypted using a strong block cipher.

3. The method of claim 1, wherein the authentication code is a keyed-hash message authentication code.

4. The method of claim 1, wherein the first and second cryptographic keys contain at least 128 bits.

5. A method for processing a file, comprising:
    deriving a first cryptographic key and a second cryptographic key from a user-provided passphrase;
    decrypting a bundle received from a remote server using the second cryptographic key;
    checking an authentication code in the bundle using the first cryptographic key; and
    decompressing the file from the bundle.

6. The method of claim 5, wherein the bundle was encrypted using a strong block cipher.

7. The method of claim 5, wherein the authentication code is a keyed-hash message authentication code.

8. The method of claim 5, wherein the first and second cryptographic keys contain at least 128 bits.

9. A non-transitory computer-readable medium storing program instructions for performing a method for processing a file, the method comprising:
    deriving a first cryptographic key and a second cryptographic key from a user-provided passphrase;
    compressing the file and adding the file to a bundle;
    generating an authentication code for the bundle using the first cryptographic key and adding the authentication code to the bundle; and
    encrypting the bundle using the second cryptographic key prior to sending the bundle to a remote server.

10. The non-transitory computer-readable medium of claim 9, wherein the bundle is encrypted using a strong block cipher.

11. The non-transitory computer-readable medium of claim 9, wherein the authentication code is a keyed-hash message authentication code.

12. The non-transitory computer-readable medium of claim 9, wherein the first and second cryptographic keys contain at least 128 bits.

13. A non-transitory computer-readable medium storing program instructions for performing a method for processing a file, the method comprising:
    deriving a first cryptographic key and a second cryptographic key from a user-provided passphrase;
    decrypting a bundle received from a remote server using the second cryptographic key;
    checking an authentication code in the bundle using the first cryptographic key; and
    decompressing the file from the bundle.

14. The non-transitory computer-readable medium of claim 13, wherein the bundle was encrypted using a strong block cipher.

15. The non-transitory computer-readable medium of claim 13, wherein the authentication code is a keyed-hash message authentication code.

16. The non-transitory computer-readable medium of claim 13, wherein the first and second cryptographic keys contain at least 128 bits.

17. A system for processing a file, comprising:
    means for deriving a first cryptographic key and a second cryptographic key from a user-provided passphrase;
    means for compressing the file and adding the file to a bundle;
    means for generating an authentication code for the bundle using the first cryptographic key and adding the authentication code to the bundle; and
    means for encrypting the bundle using the second cryptographic key prior to sending the bundle to a remote server.

18. The system of claim 17, wherein the bundle is encrypted using a strong block cipher.

19. The system of claim 17, wherein the authentication code is a keyed-hash message authentication code.

20. A system for processing a file, comprising:
    means for deriving a first cryptographic key and a second cryptographic key from a user-provided passphrase;
    means for decrypting a bundle received from a remote server using the second cryptographic key;
    means for checking an authentication code in the bundle using the first cryptographic key; and
    means for decompressing the file from the bundle.

* * * * *